US012773793B2

(12) United States Patent
Kim et al.

(10) Patent No.: US 12,773,793 B2
(45) Date of Patent: Oct. 27, 2026

(54) PARALLEL TYPE GRIPPER

(71) Applicant: POSTECH Research and Business Development Foundation, Pohang-si (KR)

(72) Inventors: Keehoon Kim, Seoul (KR); Dukchan Yoon, Ansan-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 1100 days.

(21) Appl. No.: 17/894,989

(22) Filed: Aug. 24, 2022

(65) Prior Publication Data

US 2023/0075011 A1 Mar. 9, 2023

(30) Foreign Application Priority Data

Aug. 25, 2021 (KR) ........................ 10-2021-0112628

(51) Int. Cl.
*B25J 15/08* (2006.01)

(52) U.S. Cl.
CPC ..................................... *B25J 15/08* (2013.01)

(58) Field of Classification Search
CPC ... B25J 15/0253; B25J 15/0266; B25J 15/022
See application file for complete search history.

(56) References Cited

U.S. PATENT DOCUMENTS 8,333,417 B2 12/2012 Bannasch et al.
10,279,484 B2 5/2019 Birglen
2017/0252930 A1 9/2017 Birglen
2022/0379496 A1* 12/2022 Choi .................... B25J 15/0266
2025/0073928 A1* 3/2025 Kuan ................... B25J 15/0266

FOREIGN PATENT DOCUMENTS

CN 117506976 A * 2/2024 .............. B25J 15/00
EP 1203640 A2 5/2002
KR 20010028461 A 4/2001
KR 102269012 B1 6/2021

OTHER PUBLICATIONS

Backus, S. B., and Dollar, A. M. (Feb. 5, 2018). "A Prismatic-Revolute-Revolute Joint Hand for Grasping From Unmanned Aerial Vehicles and Other Minimally Constrained Vehicles." ASME. J. Mechanisms Robotics. Apr. 2018; 10(2): 025006. https://doi.org/10.1115/1.4038975.

Birglen, L., "Design of a partially-coupled self-adaptive robotic finger optimized for collaborative robots," Auton Robot 43, 523-538 (2019). https://doi.org/10.1007/s10514-018-9802-x.

Babin V, Gosselin C., "Picking, grasping, or scooping small objects lying on flat surfaces: A design approach," The International Journal of Robotics Research. 2018;37(12):1484-1499. doi:10.1177/0278364918802346.

* cited by examiner

*Primary Examiner* — Howard J Sanders
(74) *Attorney, Agent, or Firm* — Morgan, Lewis & Bockius LLP

(57) ABSTRACT

A parallel-type gripper according to an embodiment of the present invention includes: a pair of jaws that are opposite to each other; and a parallel-type driving module in which the pair of jaws are movably connected in a horizontal direction such that they approach or move away from each other, and moving the pair of jaws in the horizontal direction so that the pair of jaws grip an object.

12 Claims, 12 Drawing Sheets

PARALLEL TYPE GRIPPER

CROSS-REFERENCE TO RELATED APPLICATION

This application claims priority to and the benefit of Korean Patent Application No. 10-2021-0112628 filed in the Korean Intellectual Property Office on Aug. 25, 2021, the entire contents of which are incorporated herein by reference.

BACKGROUND OF THE INVENTION

(a) Field of the Invention

The present invention relates to a parallel-type gripper. More particularly, the present invention relates to a parallel-type gripper including a jaw.

(b) Description of the Related Art

Due to the development of robot technology, various types of robots are being developed as they require the ability to perform various tasks in a complex environment rather than simple repetitive tasks. Most of the developed robots are equipped with parallel-type grippers.

The parallel-type gripper is a generally-used end device in manufacturing robots, and the jaw of the parallel-type gripper is made of a rigid body to forcefully pinch an object, and thus the parallel-type gripper has limitations in gripping objects of various shapes. Therefore, depending on the shape of the object to be gripped, rigid jaws of various shapes must be replaced and used. Therefore, parallel-type grippers including rigid jaws have no choice but to be used for limited objects in a standardized environment.

To compensate for this, a fin-ray gripper that can stably grip by adapting to the shape of objects of various shapes using the flexible mechanism of soft materials was developed. However, the fin-lay gripper has low repeatability and weak gripping force due to the characteristic of the soft material.

In addition, a parallel-type gripper that implements object-adaptive gripping and strong gripping was developed by applying a rigid finger mechanism to a rotation-type gripper. However, when the distal end of the finger mechanism expressed as a triangle link contacts the surrounding environment, interaction with various surrounding environments is impossible. In particular, in the process of gripping an object by a parallel-type gripper, contact and collision with the ground on which the object is placed act as a hindrance to the gripping operation.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention is to provide a parallel-type gripper that is adaptable to the surrounding environment and capable of object-adaptive gripping as to solve the problem of the background art described above.

A parallel-type gripper according to an embodiment of the present invention includes: a pair of jaws that are opposite to each other; and a parallel-type driving module in which the pair of jaws are movably connected in a horizontal direction such that they approach or move away from each other, and moving the pair of jaws in the horizontal direction so that the pair of jaws grip an object, wherein each of the pair of jaws includes a contact portion extending in a vertical direction and contacting the object, a first actuation mechanism connected to the contact portion and configured to move the contact portion in the vertical direction, and a second actuation mechanism connected to the first actuation mechanism and the contact portion and configured to maintain a posture in which the contact portion extends in the vertical direction.

The first actuation mechanism may include an upper joint portion and a lower joint portion that are connected while forming a first angle therebetween and passively rotate to move the contact portion in the vertical direction when in contact with the ground, and a first elastic member connected between the upper joint portion and the lower joint portion to provide a restoring force.

The contact portion may be connected to the lower end portion of the lower joint portion.

The first angle may change as a refraction interval, which is a distance between the upper end portion of the upper joint portion and the lower end portion of the contact portion, changes.

The parallel-type gripper may further include a potentiometer installed on the upper joint portion for measuring the refraction interval.

The first actuation mechanism may further include a pressing portion connected to the lower joint portion and rotating the contact portion by pressing the contact portion.

The second actuation mechanism may include a link unit connected to the first actuation mechanism, and a support portion that is connected to the link unit and supports the contact portion to maintain the posture of the contact portion in the vertical direction.

The link unit may include an upper link corresponding to the upper joint portion and a lower link corresponding to the lower joint portion, and the angle between the upper link and the lower link may change in response to the change in the first angle.

When the pressing portion does not press the contact portion, the contact portion may maintain a vertical orientation, and when the pressing portion presses the contact portion, the contact portion may rotate to have an inclined posture.

The second actuation mechanism may further include a second elastic member that provides a restoring force by being connected between the lower link and the contact portion.

The pair of jaws may further include a detachable portion that detachably connect the pair of jaws to the parallel-type driving module, and the detachable portion may include a first detachable portion installed on the pair of jaw and a second detachable portion installed on the parallel-type driving module.

The pair of jaws may include a first jaw and a second jaw that are opposite to each other, and the first jaw and the second jaw may be disposed symmetrically about a central axis of the parallel-type driving module.

A refraction interval of the first jaw and a refraction interval of the second jaw may be adjusted differently.

The parallel-type gripper according to the embodiment of the present invention grips the object in adaptability with the external environment using a pair of jaws including a first actuation mechanism and a second actuation mechanism when the contact portion in contact with the object is in contact with the ground, and accordingly, complex control algorithms and sensors for interaction with the external environment, such as impedance control, are not required. Therefore, the parallel-type gripper may have a simple structure.

In addition, since the contact portion can be restored in the vertical direction, it can have adaptability and safety when in contact with the surrounding environment, and it is possible to grip or scoop the object according to the refraction interval.

DETAILED DESCRIPTION OF THE EMBODIMENTS

Figure 1:
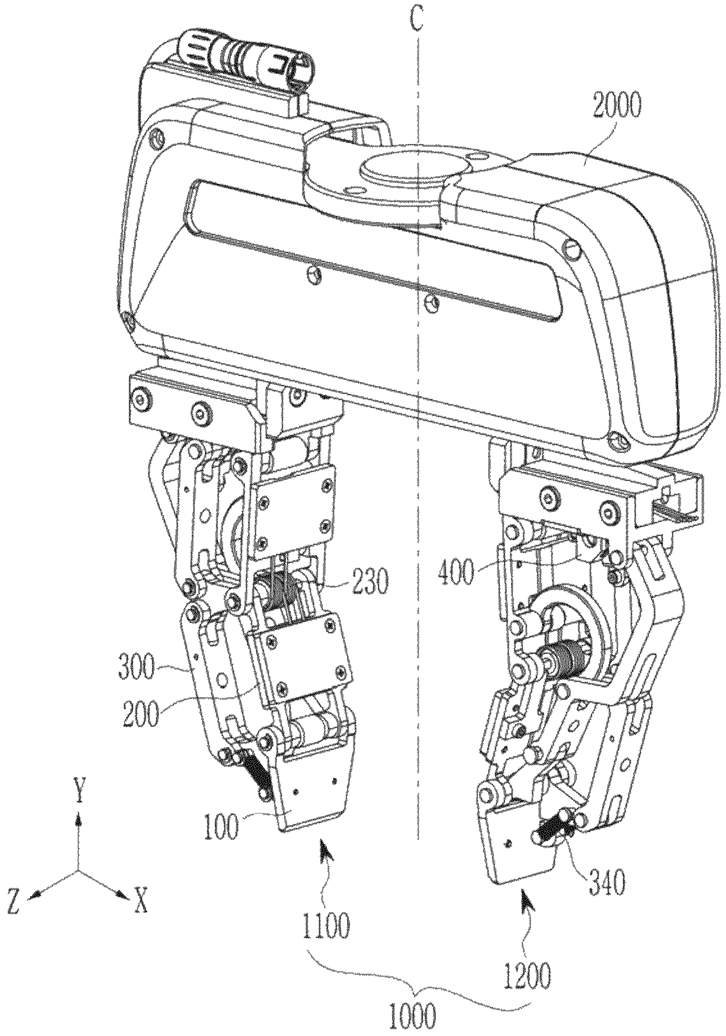
FIG. 1 is a perspective view of a parallel-type gripper according to an embodiment of the present invention.

Hereinafter, various embodiments of the present invention will be described in detail with reference to the accompanying drawing such that a person of an ordinary skill can easily practice it in the technical field to which the present invention belongs. The present invention may be implemented in several different forms and is not limited to the embodiments described herein.

The drawings and description are to be regarded as illustrative in nature and not restrictive. Like reference numerals designate like elements throughout the specification.

Hereinafter, a parallel-type gripper according to an embodiment of the present invention will be described with reference to FIG. 1 to FIG. 6(*a*).

Figure 2:
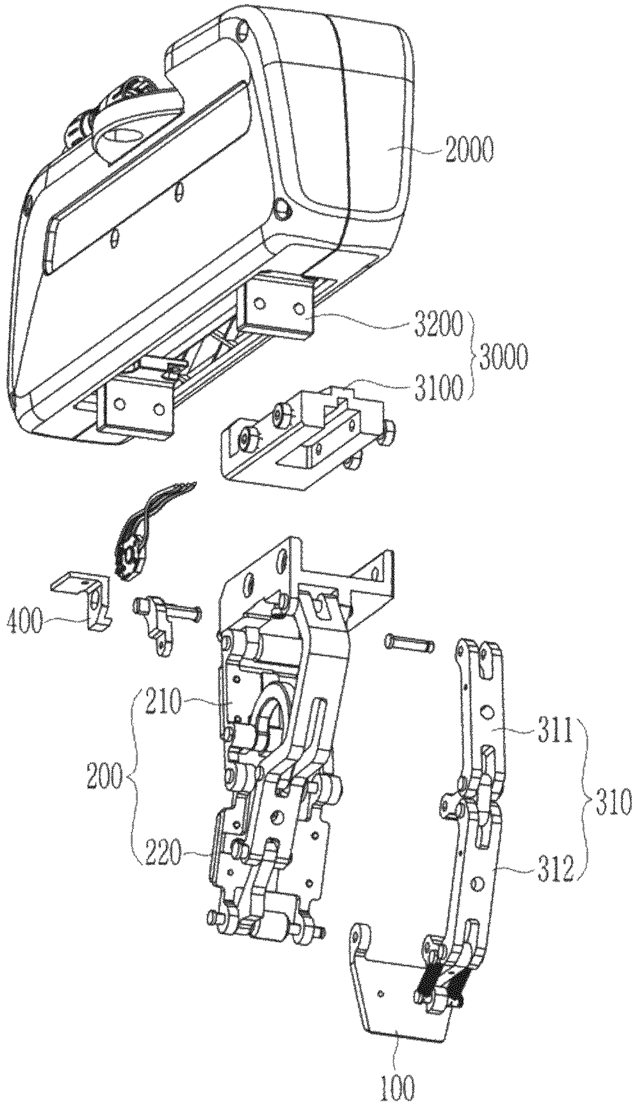
FIG. 2 is an exploded perspective view of a jaw of the parallel-type gripper according to the embodiment of the present invention.
Figure 3:
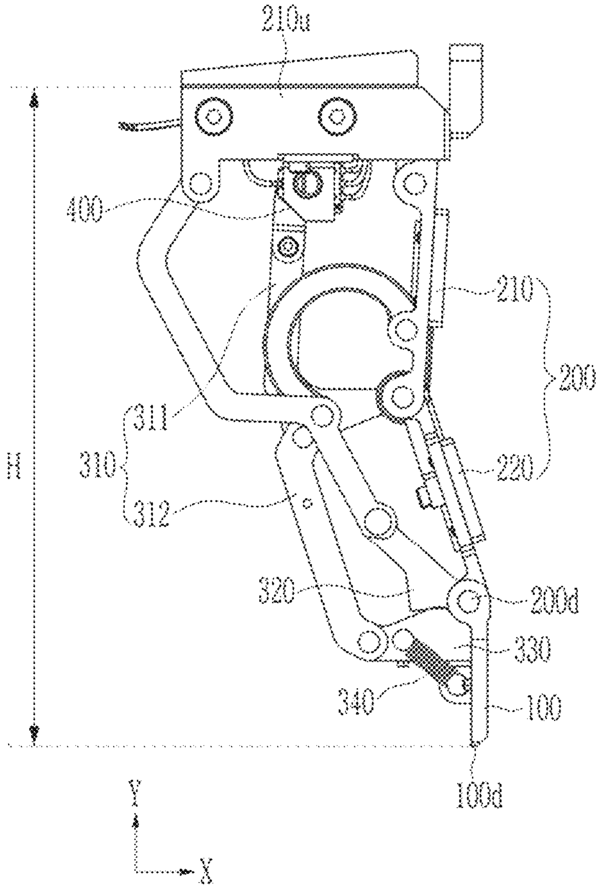
FIG. 3 is a front view of a jaw of the parallel-type gripper according to the embodiment of the present invention.
Figure 4:
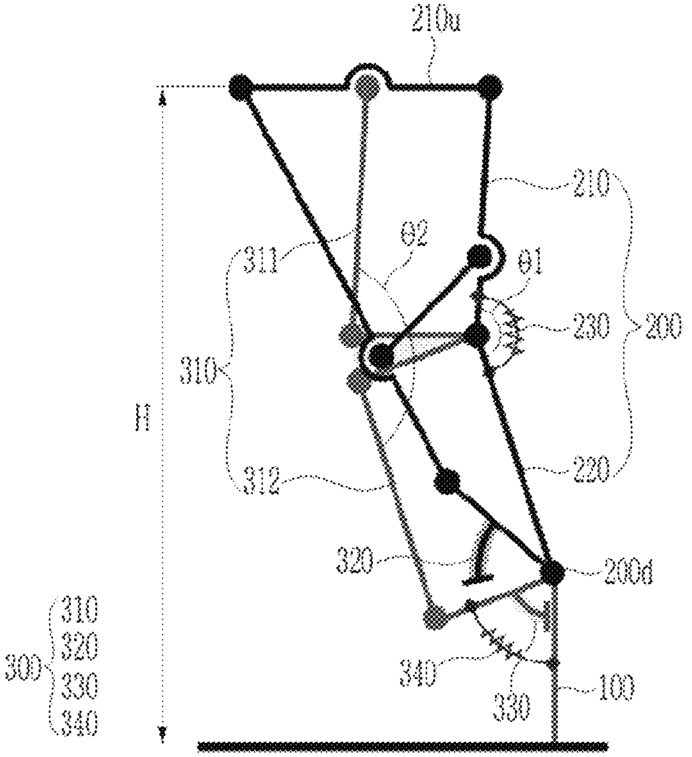
FIG. 4 is an equivalent model diagram of FIG. 3.
Figures 5A, 5B, 5C:
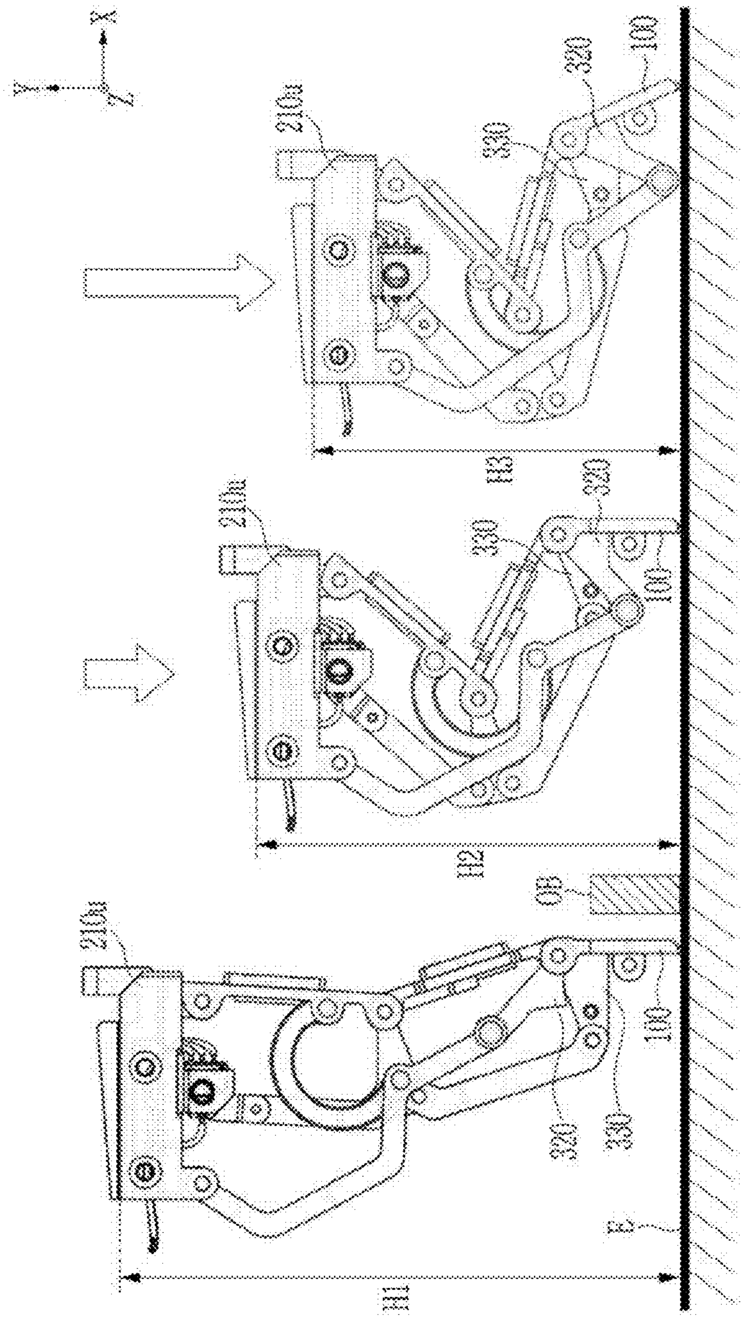
FIGS. 5(*a*), 5(*b*) and 5(*c*) are front views that sequentially showing a state of pressing a contact portion while the jaw of the parallel-type gripper according to the embodiment of the present invention contacts the ground and reduces the refraction interval.
Figures 6A, 6B, 6C:
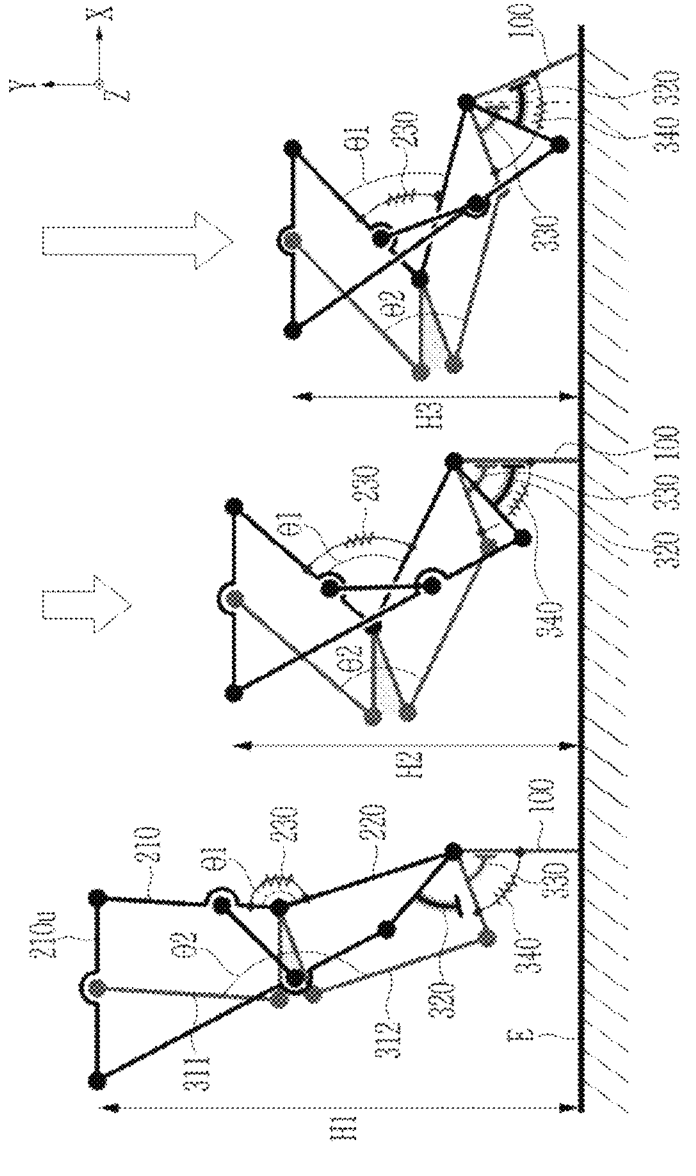
FIGS. 6(*a*), 6(*b*) and 6(*c*) are an equivalent model diagram of FIGS. 5(*a*), 5(*b*) and 5(*c*).

FIG. 1 is a perspective view of a parallel-type gripper according to an embodiment of the present invention, FIG. 2 is an exploded perspective view of a jaw of the parallel-type gripper according to the embodiment of the present invention, FIG. 3 is a front view of a jaw of the parallel-type gripper according to the embodiment of the present invention, FIG. 4 is an equivalent model diagram of FIG. 3, FIGS. 5(*a*), 5(*b*) and 5(*c*) are front views that sequentially showing a state of pressing a contact portion while the jaw of the parallel-type gripper according to the embodiment of the present invention contacts the ground and reduces the refraction interval, and FIGS. 6(*a*), 6(*b*) and 6(*c*) are equivalent model diagrams of FIGS. 5(*a*), 5(*b*) and 5(*c*).

As shown in FIG. 1 to FIG. 6(*c*), a parallel-type gripper according to an embodiment of the present invention includes a pair of jaws 1000, a parallel-type driving module 2000, and a detachable portion 3000.

The pair of jaws 1000 may include a first jaw 1100 and a second jaw 1200 that are opposite to each other. Hereinafter, one jaw will be described in detail.

The jaw 1000 may include a contact portion 100, a first actuation mechanism 200, a second actuation mechanism 300, and a potentiometer 400.

The contact portion 100 has a quadrangle plate shape and may be arranged in a direction toward a ground E on which an object OB is positioned. For example, the contact portion 100 may have a shape in which a pair of jaws 1000 extend in a direction perpendicular to the direction opposite to each other. That is, the contact portion 100 extends along the vertical direction (Y direction), and may directly grip the object OB in contact with the object OB.

In the specification, 'vertical direction (Y direction)' refers to the direction perpendicular to the direction in which the pair of jaw 1000 face, or the direction perpendicular to a direction in which the pair of jaws 1000 move closer to or away from each other to grip the object OB.

The first actuation mechanism 200 is connected to the contact portion 100, and when the contact portion 100 is in contact with the ground E, the contact portion 100 can manually perform reciprocal movement in the vertical direction (Y direction) while the contact portion 100 is supported on the ground E. The jaw 1000 has vertical conformation to external forces by such a first actuation mechanism 200.

The first actuation mechanism 200 may include an upper joint portion 210, a lower joint portion 220, and a first elastic member 230.

As shown in FIG. 4, the upper joint portion 210 and the lower joint portion 220 may be connected to each other while having a first angle θ1 therebetween. In an initial state, the first angle θ1 has a value that is smaller than 180 degrees, such that the adaptability in the vertical direction (Y direction) to the external force of the first actuation mechanism 200 can be stably ensured.

In addition, the upper joint portion 210 and the lower joint portion 220 rotate passively (external force pressing the contact portion toward the ground is applied) when the contact portion 100 contacts the ground E to vertically move the lower portion 220*d* of the lower joint portion 220 in the vertical direction (Y direction). In this case, since the contact portion 100 may be connected to a lower end portion 220*d* of the lower joint portion 220, and the contact portion 100 may be moved in the vertical direction (Y direction) along a movement path of the lower end portion 220*d* of the lower joint portion 220.

The first elastic member 230 may be connected to the upper joint portion 210 and the lower joint portion 220 to provide a restoring force. The first elastic member 230 may include a torsion spring. For example, when the upper joint portion 210 and the lower joint portion 220 are adjacent to each other by an external force that moves the upper joint portion 210 toward the ground E, the first elastic member 230 may provide reposition force to the upper joint portion 210 and the lower joint portion 220.

The contact portion 100 contacts the ground E, and then, as an upper end portion 210*u* of the upper joint portion 210 moves toward the ground E, a refraction interval H defined by a distance between the upper end portion 210*u* of the upper joint portion 210 and the lower end portion 100*d* of the contact portion 100 changes. Accordingly, the first angle Θ1 changes.

Due to the first actuation mechanism 200, the contact portion 100 has 1 degree of freedom (DOF) and can move in the vertical direction (Y direction). For example, according to an embodiment, the first actuation mechanism 200 may always implement a motion path of the lower end portion 200*d* (i.e., a connection point with the contact portion 100) of the lower joint portion 220 in the vertical direction (Y direction). In the present embodiment, Hart's mechanism is shown as the first actuation mechanism 200 (refer to FIG. 4, FIGS. 6(*a*), 6(*b*) and 6(*c*), etc.), but is not limited thereto, and the first actuation mechanism can be implemented with various mechanisms that implement 1 DOF, such as a gear train, a wire-pully, and the like.

According to an embodiment, the first actuation mechanism 200 may further include a pressing unit 320. The pressing unit 320 may passively rotate the contact portion 100 to scoop the object OB. In more detail, when the refraction interval H (which is an interval between the upper end portion 210*u* of the upper joint portion 210 and the lower end portion 100*d* of the contact portion 100) is smaller than a predetermined size, the contact portion 100 is pressed by the pressing unit 320 such that the first actuation mechanism 200 may rotate.

For example, referring to FIG. 3 and FIG. 4, the contact portion 100 and the lower joint portion 220 are connected to be relatively rotatably around the lower end portion 220*d* of the lower joint portion 220, and the pressing portion 320 may include a protrude-shaped member connected to the lower joint portion 220. When the lower joint portion 220 is rotated in the counterclockwise direction to approach the contact portion 100, the pressing unit 320 connected to the lower joint portion 220 may rotate the vertically arranged contact portion 100 in the counterclockwise direction.

The second actuation mechanism 300 is connected to the first actuation mechanism 200 and the contact portion 100, and even when the contact portion 100 contacts the ground E, the posture of the contact portion 100 can be maintained vertically. The object OB can be stably gripped using the second actuation mechanism 300.

The second actuation mechanism 300 may include a link unit 310, a support portion 330, and a second elastic member 340.

The link unit 310 may be connected to the first actuation mechanism 200. The link unit 310 and the first actuation mechanism 200 may be connected to each other to form a parallelogram mechanism of a four-section link structure together. (Refer to FIG. 4 and FIGS. 6(*a*), 6(*b*) and 6(*c*))

The link unit 310 may include an upper link 311 corresponding to the upper joint portion 210, and a lower link 312 corresponding to the lower joint portion 220. The upper joint portion 210 and the upper link 311 may have a parallelogram shape together, and the lower joint portion 220 and the lower link 312 may also have a parallelogram shape together.

In response to the change in the first angle 81, a second angle 82 between the upper link 311 and the lower link 312 changes. In this case, the parallelogram shape between the upper joint portion 210 and the upper link 311 and the parallelogram shape between the lower joint portion 220 and the lower link 312 may be maintained without changes. Accordingly, the contact portion 100 can maintain a vertically arranged posture.

The second elastic member 340 may be connected to the lower link 312 and the contact portion 100 to provide a restoring force. The second elastic member 340 may include a tensile spring. For example, referring to FIG. 3 and FIG. 4, the contact portion 100 is rotatably connected to the lower end portion 220*d* of the lower joint portion 220, and, when the contact portion 100 rotates in the counterclockwise direction, the second elastic member 340 may provide a restoring force in the clockwise direction to the contact portion 100.

The support portion 330 may be a protrude-shaped member connected to the lower link 312 of the link unit 310. The support portion 330 may support the contact portion 100 in a vertically arranged state. For example, in FIG. 3 and FIG. 4, the support portion 330 may function as a stopper for supporting the contact portion 100 having a restoring force in the counterclockwise direction by a second elastic member 340 to be described later.

The potentiometer 400 is installed in the upper joint portion 210 to measure the refraction interval H. The potentiometer 400 measures the refraction interval H and feeds back to a manipulator M connected to the parallel-type driving module 2000 to control the position of the jaw, or uses the parallel-type driving module 2000 to control the position of the jaw, or may determine the shape information of the surrounding environment in real time by measuring the refraction interval H while moving the contact portion 100 in contact with the ground E using the parallel-type driving module 2000. For example, when there are protrusions and depressions or when the contact portion 100 is moved in contact with the ground along the irregularly shaped ground, the contact portion 100 is moved in the vertical direction along the protrusions and depressions or the shape of the ground, and thus the position of the contact portion 100 can be determined in real time. That is, the contact portion 100 performs a function similar to that of the probe, and thus the shape information of the ground E can be detected.

The parallel-type driving module 2000 can grip the object OB by moving the pair of jaws 1000 in the horizontal direction (X direction). Since the contact portion 100 of the pair of jaws 1000 can only move in the vertical direction (Y direction) by the above-described first actuation mechanism 200, the contact portion 100 can press the object OB by moving the pair of jaws 1000 in the horizontal direction (X direction) using the parallel-type driving module 2000.

Hereinafter, referring to FIGS. 5(*a*), 5(*b*) and 5(*c*) and FIGS. 6(*a*), 6(*b*) and 6(*c*), the operation of the jaws of the parallel-type gripper according to the embodiment of the present invention will be described in detail.

First, referring to FIG. 5 (*a*) and FIG. 6 (*a*), the upper end portion 210*u* of the upper joint portion 210 descends toward the ground E along the vertical direction (Y direction) such that the lower end portion 100*d* of the contact portion 100 contacts the ground E. The support portion 330 supports the contact portion 100 connected to the second elastic member 340 to maintain the contact portion 100 in a vertical state. In addition, the pressing portion 320 connected to the lower joint portion 220 is spaced apart from the contact portion 100 and thus does not press the contact portion 100. In this case, the refraction interval H between the upper end portion 210*u* of the upper joint portion 210 and the lower end portion 100*d* of the contact portion 100 has a first refraction interval H1.

Next, referring to FIG. 5 (*b*) and FIG. 6 (*b*), the upper end portion 210*u* of the upper joint portion 210 descends further toward the ground E along the vertical direction. Since the contact portion 100 is already in contact with the ground E, the upper joint portion 210 and the lower joint portion 220 of the first actuation mechanism 200 are rotated to be adjacent to each other by the repulsive force of the ground E, and the first angle θ1 is reduced. In this case, the jaw 1000 has a second refraction interval H2 that is smaller than the first refraction interval H1. In this case, the upper link 311 and the lower link 312 of the second actuation mechanism 300 connected to the first actuation mechanism 200 are also rotated to be adjacent to each other, and thus the second angle θ2 between them is reduced. In this case, the press portion connected to the lower joint portion 220 rotates 320 degrees to press a support contact portion 100. Even in this case, the contact portion 100 maintains a vertical state such that the support portion pressing unit 320 may stably hold the object OB with the force of pressing the contact portion 100. Therefore, the jaw 1000 maintains adaptability with the ground E, that is, the surrounding environment, and can stably hold the object OB.

Next, referring to FIG. 5 (*c*) and FIG. 6 (*c*), when the upper end portion 210*u* of the upper joint portion 210 descends further toward the ground E along the vertical direction (Y direction), the upper joint portion 210 and the lower joint portion 220 of the first actuation mechanism 200 are rotated to be more adjacent to each other by the repulsive force of the ground E, which is already in contact with the contact portion 100, and thus the first angle θ1 becomes small, and the upper link 311 and the lower link 312 of the second actuation mechanism 300 connected to the first actuation mechanism 200 are also rotated to be more adjacent to each other, and thus the second angle θ2 becomes smaller. In this case, the jaw 1000 has a third refraction interval H3 that is smaller than the second refraction interval H2. In this case, the pressing portion 320 connected to the lower joint portion 220 is further rotated to further press the contact portion 100. Accordingly, only the pressing portion 320 presses the contact portion 100, and the contact portion 100 maintains contact with the ground E and rotates to be inclined with respect to the ground E. Accordingly, it is possible to position the object OB on the inclined contact portion 100 such that the object OB can be scooped.

When the contact portion 100 is separated from the ground E, the contact portion 100 recovers the vertical state again by the second elastic member 340, and the initial state of the first actuation mechanism 200 and the second actuation mechanism 300 is restored by the first elastic member 230.

Meanwhile, referring to FIG. 2, the detachable portion 3000 detachably connects the pair of jaws 1000 and the parallel-type driving module 2000 to each other.

The detachable portion 3000 may include a first detachable portion 3100 installed in the pair of jaws 1000 and a second detachable portion 3200 installed in the parallel-type driving module 2000.

Therefore, since the pair of jaws 1000 can be freely detached from the parallel-type driving module 2000 by using the detachable portion 3000, the maintenance and repair of the jaws 1000 become easy. In addition, since the pair of jaws 1000 can be applied to various parallel-type driving modules 2000, the parallel-type gripper according to the embodiment of the present invention can be applied to various robots.

Meanwhile, as shown in FIG. 1, the first jaw 1100 and the second jaw 1200 can be disposed by inverting left and right with respect to a central axis C of the parallel-type driving module 2000. That is, the opposing first jaw 1100 and second jaw 1200 may be disposed symmetrical to each other with respect to the central axis C of the parallel-type driving module 2000. Therefore, the first jaw 1100 and the second jaw 1200 can grip the object OB by applying uniform pressure to the object OB. In this case, a refraction interval Ha (refer to FIGS. 9(*a*) and 9(*b*)) of the first jaw 1100 and a refraction interval Hb (refer to FIGS. 9(*a*) and 9(*b*)) of the second jaw 1200 can be adjusted to each other.

Hereinafter, a driving method of gripping or pinching an object using a parallel-type gripper according to an embodiment of the present invention will be described in detail with reference to the drawings.

Figure 7:
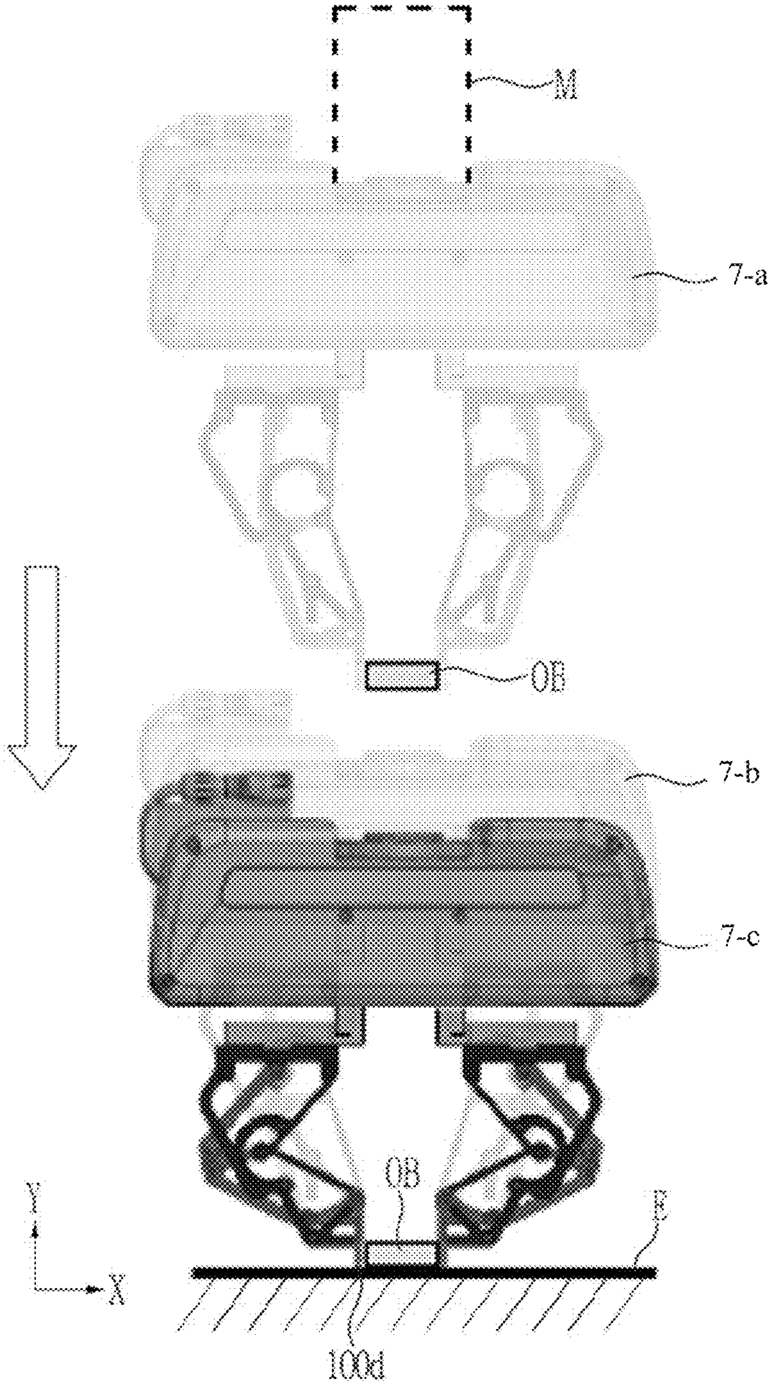
FIG. 7 is provided to describe a driving method of the operation for stably positioning the object on the ground by using the parallel-type gripper according to the embodiment of the present invention.

FIG. 7 is provided to describe a driving method of the operation for stably positioning the object on the ground by using the parallel-type gripper according to the embodiment of the present invention.

As shown in the illustration 7-*a*, the manipulator M lowers the parallel-type gripper holding the object OB in the vertical direction (Y). In addition, as shown in the illustrations 7-*b* and 7-*c*, when the manipulator M lowers the parallel-type gripper further along the vertical direction, the lower end portion 100*d* of the contact portion 100 of the parallel-type gripper comes into contact with the ground E. In this case, the object OB protected by the lower end portion 100*d* of the contact portion 100 of the parallel-type gripper is stably positioned on the ground E without being damaged due to the adaptability in the vertical direction.

Figure 8:
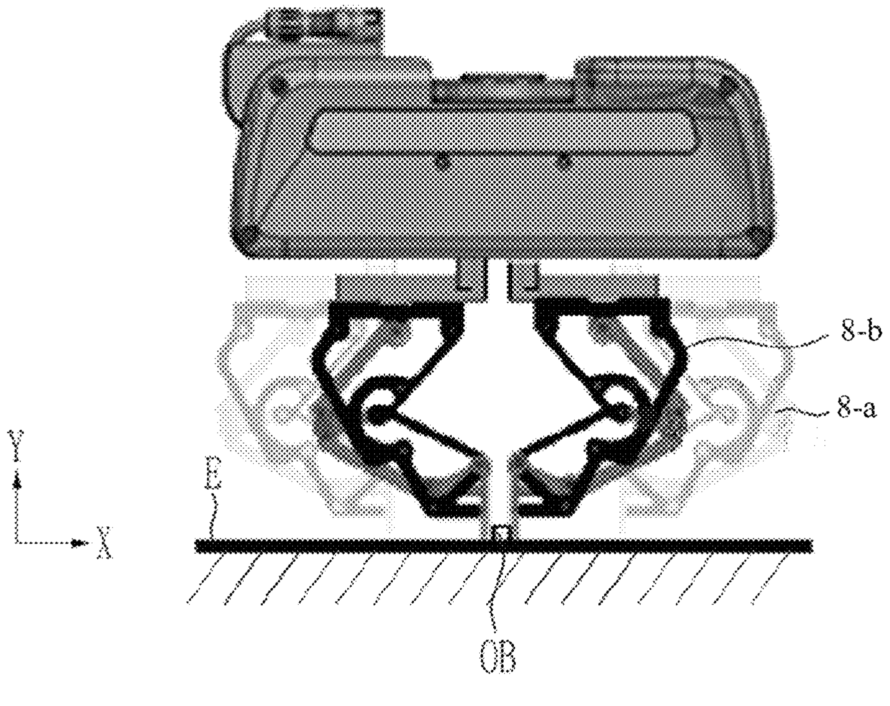
FIG. 8 is provided to describe a driving method of the operation for gripping the object by using the parallel-type gripper according to the embodiment of the present invention.

FIG. 8 is provided to describe a driving method of the operation for gripping the object by using the parallel-type gripper according to the embodiment of the present invention.

As shown in the illustration 8-*a*, the contact portion 100 may contact the ground E with adaptability in the vertical direction by using the first actuation mechanism 200. In addition, as shown in the illustration 8-*b*, the contact portion 100 of the jaw 1000 is brought into contact with the object OB using the parallel-type driving module 2000, and the contact portion 100 is pressed with much stronger force by using the support portion 330 of the second actuation mechanism 300 and the pressing portion 320 of the first actuation mechanism 200 to stably grip the small or thin object OB.

Figures 9A, 9B:
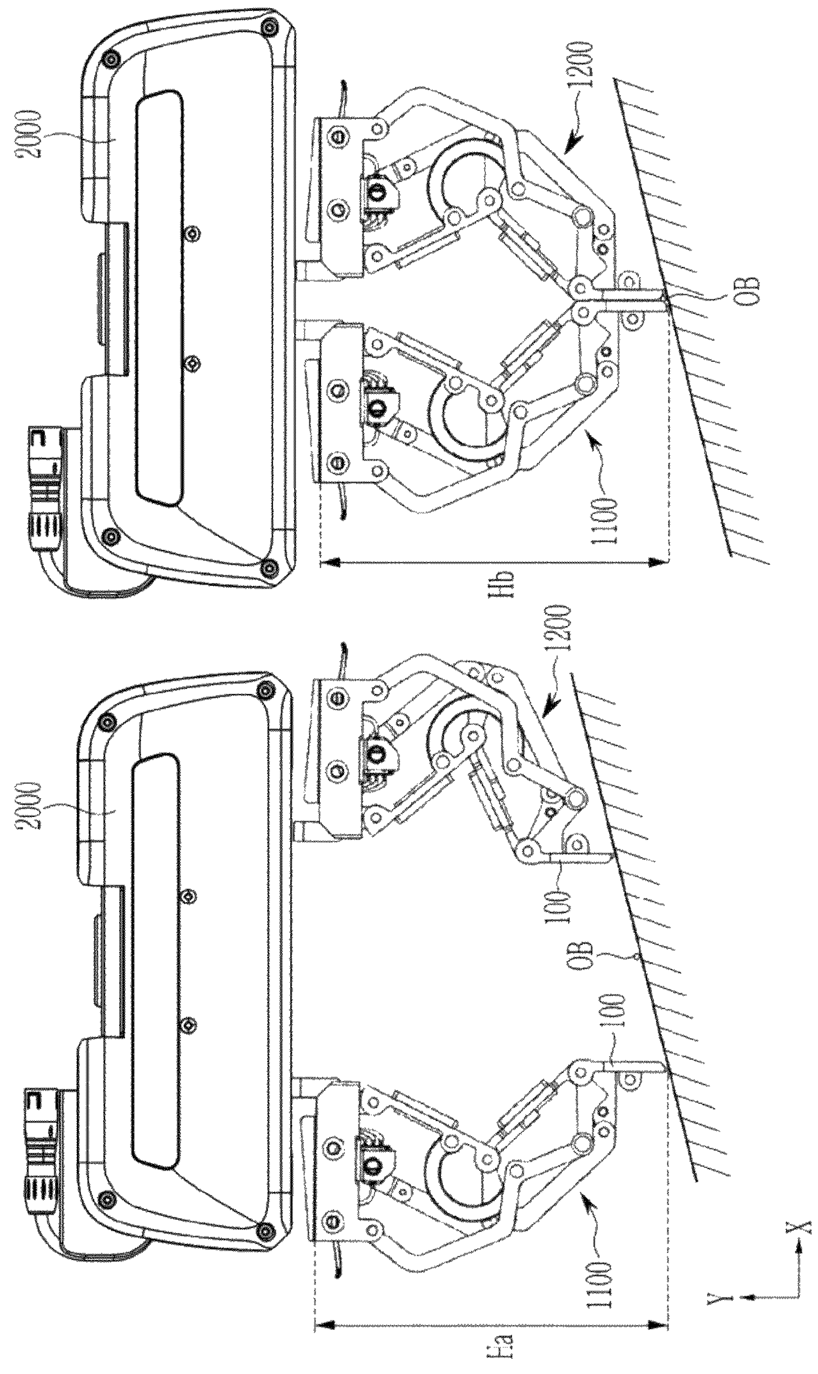
FIGS. 9(*a*) and 9(*b*) are provided to describe a driving method of the operation for gripping the object with adaptability on an inclined ground by using the parallel-type gripper according to the embodiment of the present invention.

FIGS. 9(*a*) and 9(*b*) are provided to describe a driving method of the operation for gripping the object with adaptability on an inclined ground by using the parallel-type gripper according to the embodiment of the present invention.

As shown in FIG. 9 (*a*), the refraction interval Ha of the first jaw 1100 and the refraction interval Hb of the second jaw 1200 are different from each other due to the adaptability in the vertical direction such that the contact portion 100 of the first jaw 1100 and the contact portion 100 of the second jaw 1200 are placed on the inclined ground E in a vertical state.

In addition, as shown in FIG. 9 (*b*), the contact portion 100 of the first jaw 1100 and the contact portion 100 of the second jaw 1200 can be moved in the horizontal direction (X direction) by using the parallel-type driving module 2000 to stably grip the object OB.

Figures 10A, 10B, 10C:
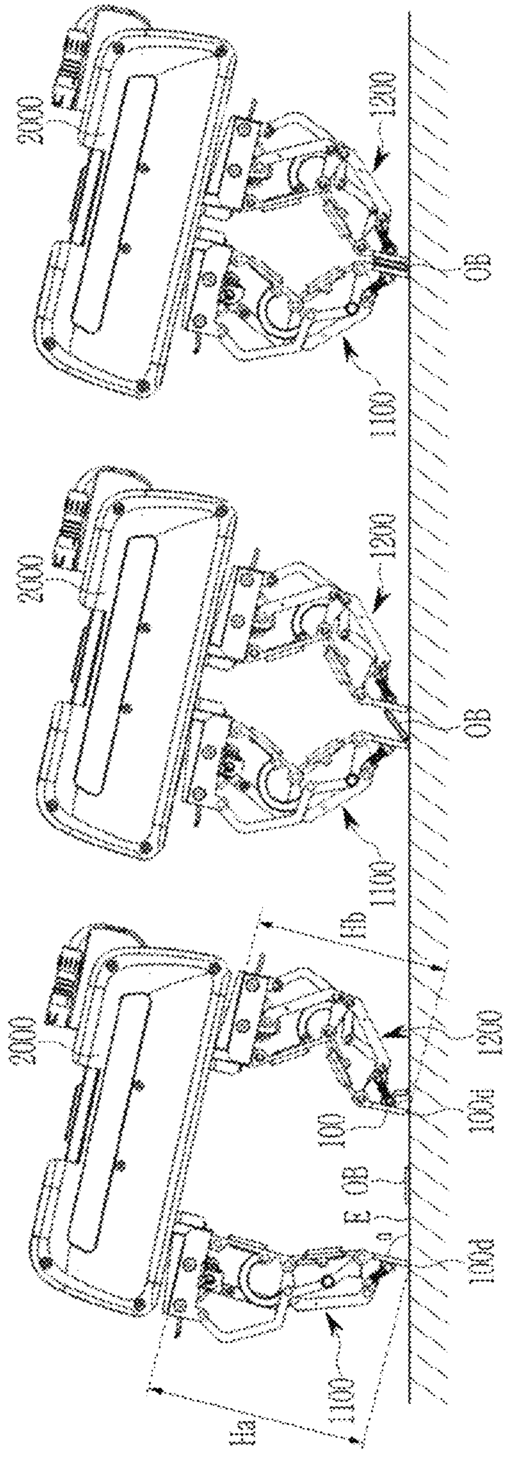
FIGS. 10(*a*), 10(*b*) and 10(*c*) are provided to describe a driving method of the operation for stably gripping a thin object by using the parallel-type gripper according to the embodiment of the present invention.

FIGS. 10(*a*), 10(*b*) and 10(*c*) are provided to describe a driving method of the operation for stably gripping a thin object by using the parallel-type gripper according to the embodiment of the present invention.

As shown in FIG. 10 (*a*), after making both the lower end portion 100*d* of the contact portion 100 of the first jaw 1100 and the lower end portion 100*d* of the contact portion 100 of the second jaw 1200 contact the ground E, the parallel-type driving module 2000 is inclined. In this case, the refraction interval Ha of the first jaw 1100 and the refraction interval Hb of the second jaw 1200 are different due to the adaptability in the vertical direction. Accordingly, the contact portion 100 of the first jaw 1100 and the contact portion 100 of the second jaw 1200 come into contact with the ground E at a predetermined inclination angle α.

As shown in FIG. 10 (*b*), when the contact portion 100 of the first jaw 1100 and the contact portion 100 of the second jaw 1200 are moved to be close to each other by using the parallel-type driving module 2000, one contact portion 100 may dig under the object. As shown in FIG. 10 (*c*), as the contact portion 100 of the first jaw 1100 and the contact portion 100 of the second jaw 1200 approach, the thin object OB is rotated, thereby stably holding the thin object OB.

Figures 11A, 11B:
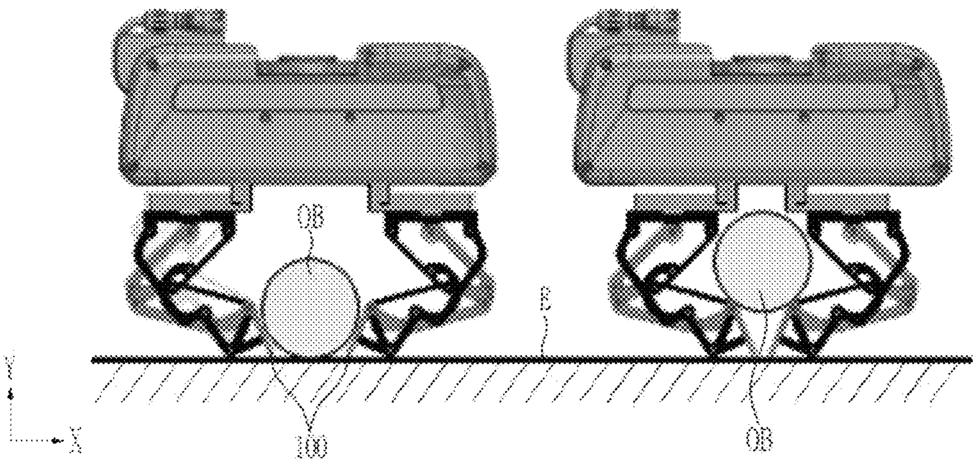
FIGS. 11(*a*) and 11(*b*) are provided to describe a driving method of the operation for scooping the object using the parallel-type gripper according to the embodiment of the present invention.

FIGS. 11(*a*) and 11(*b*) provided to describe a driving method of the operation for scooping the object using the parallel-type gripper according to the embodiment of the present invention.

As shown in FIG. 11(*a*), the contact portion 100 maintains contact with the ground E and rotates to have an inclined state by using the second actuation mechanism 300. Accordingly, it is possible to position the object OB over the contact portion 100 in the inclined state.

In addition, as shown in FIG. 11 (*b*), the object OB may be scooped by moving the contact portion 100 of the first jaw 1100 and the contact portion 100 of the second jaw 1200 in the horizontal direction (X direction) by using the parallel-type driving module 2000. Therefore, it is possible to stably hold the object OB by using the upper joint portion 210 and the lower joint portion 220 of the first actuation mechanism 200 together with the contact portion 100.

Figure 12:
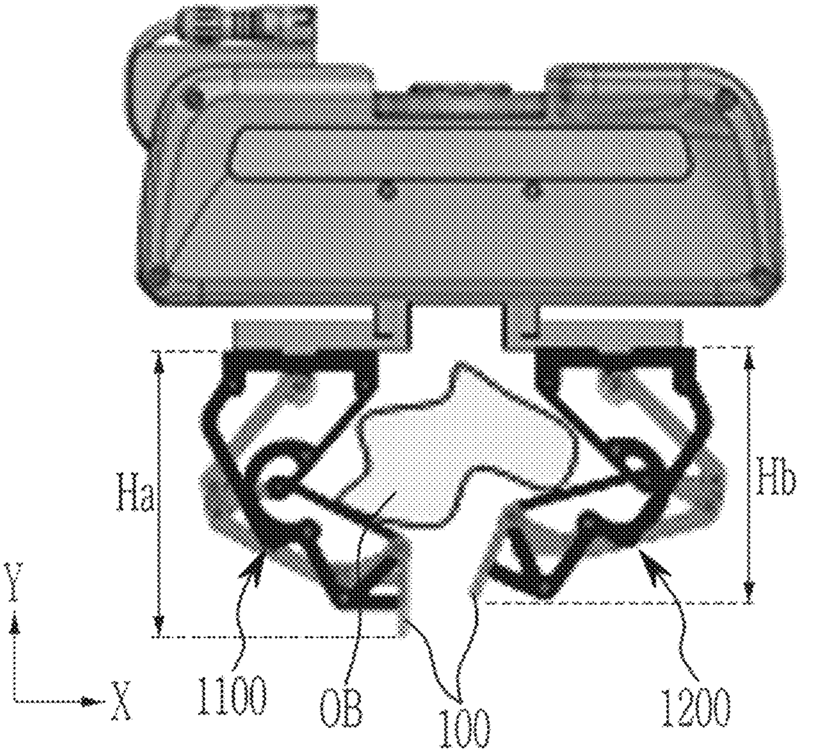
FIG. 12 is provided to describe a driving method of the operation for gripping corresponding to the shape of the object by using the parallel-type gripper according to the embodiment of the present invention.

FIG. 12 is provided to describe a driving method of the operation for gripping corresponding to the shape of the object by using the parallel-type gripper according to the embodiment of the present invention.

As shown in FIG. 12, when the shape of the object OB is a polygonal or irregular shape, it is possible to hold the object OB by differentiating the refraction interval Ha of the first jaw 1100 and the refraction interval Hb of the second jaw 1200. That is, the object OB having various shapes may be stably gripped by gripping the object OB using the upper joint portion 210 and the lower joint portion 220 of the first actuation mechanism 200 together with the contact portion 100.

Although the present invention has been described through a preferred embodiment as described above, the present invention is not limited thereto, and those skilled in the art to which the present invention pertains will readily understand that various modifications and variations are possible as long as it does not deviate from the concept and range of the claims range described below.

<Description of symbols>

| | |
|---|---|
| 100: contact portion | 200: first actuation mechanism |
| 210: upper joint portion | 220: lower joint portion |
| 230: first elastic member | 300: second actuation mechanism |
| 310: link unit | 330: support portion |
| 320: pressing portion | 340: second elastic member |

What is claimed is:

1. A parallel-type gripper comprising:

a pair of jaws opposite to each other; and a parallel-type driving module in which the pair of jaws are movably connected in a horizontal direction such that they approach or move away from each other, and moving the pair of jaws in the horizontal direction so that the pair of jaws grip an object, wherein each of the pair of jaws comprises a contact portion extending in a vertical direction and contacting the object, a first actuation mechanism connected to the contact portion and configured to move the contact portion in the vertical direction, and a second actuation mechanism connected to the first actuation mechanism and the contact portion and configured to maintain a posture in which the contact portion extends in the vertical direction, wherein the first actuation mechanism comprises an upper joint portion and a lower joint portion that are connected while forming a first angle therebetween and passively rotate to move the contact portion in the vertical direction when in contact with a ground, and a pressing portion connected to the lower joint portion and configured to rotate the contact portion, and wherein the pressing portion is configured to press the contact portion as a refraction interval is smaller than a predetermined distance, the refraction interval being a distance between an upper end portion of the upper joint portion and a lower end portion of the contact portion.

2. The parallel-type gripper of claim 1, wherein the first actuation mechanism further comprises a first elastic member connected between the upper joint portion and the lower joint portion to provide a restoring force.

3. The parallel-type gripper of claim 2, wherein the contact portion is connected to a lower end portion of the lower joint portion.

4. The parallel-type gripper of claim 2, wherein the first angle changes as the refraction interval changes.

5. The parallel-type gripper of claim 4, wherein the pair of jaws further comprise a detachable portion that detachably connect the pair of jaws to the parallel-type driving module, and the detachable portion includes a first detachable portion installed on the pair of jaws and a second detachable portion installed on the parallel-type driving module.

6. The parallel-type gripper of claim 4, wherein the pair of jaws comprise a first jaw and a second jaw that are opposite to each other, and the first jaw and the second jaw are disposed symmetrically about a central axis of the parallel-type driving module.

7. The parallel-type gripper of claim 6, wherein a refraction interval of the first jaw and a refraction interval of the second jaw are adjusted differently.

8. The parallel-type gripper of claim 1, wherein the second actuation mechanism comprises a link unit connected to the first actuation mechanism, and a support portion that is connected to the link unit and supports the contact portion to maintain the posture of the contact portion in the vertical direction.

9. The parallel-type gripper of claim 8, wherein the link unit comprises an upper link corresponding to the upper joint portion and a lower link corresponding to the lower joint portion, and wherein a second angle between the upper link and the lower link changes in response to a change in the first angle.

10. The parallel-type gripper of claim 1, wherein when the pressing portion does not press the contact portion, the contact portion maintains a vertical orientation, and when the pressing portion presses the contact portion, the contact portion rotates to have an inclined posture.

11. A parallel-type gripper comprising:

a pair of jaws opposite to each other; and a parallel-type driving module in which the pair of jaws are movably connected in a horizontal direction such that they approach or move away from each other, and moving the pair of jaws in the horizontal direction so that the pair of jaws grip an object, wherein each of the pair of jaws comprises a contact portion extending in a vertical direction and contacting the object, a first actuation mechanism connected to the contact portion and configured to move the contact portion in the vertical direction, and a second actuation mechanism connected to the first actuation mechanism and the contact portion and configured to maintain a posture in which the contact portion extends in the vertical direction, wherein the first actuation mechanism comprises an upper joint portion and a lower joint portion that are connected while forming a first angle therebetween and passively rotate to move the contact portion in the vertical direction when in contact with a ground, and a first elastic member connected between the upper joint portion and the lower joint portion to provide a restoring force, wherein the first angle changes as a refraction interval, which is a distance between an upper end portion of the upper joint portion and a lower end portion of the contact portion, changes, and wherein the parallel-type gripper further comprises a potentiometer installed on the upper joint portion for measuring the refraction interval.

12. A parallel-type gripper comprising:

a pair of jaws opposite to each other; and a parallel-type driving module in which the pair of jaws are movably connected in a horizontal direction such that they approach or move away from each other, and moving the pair of jaws in the horizontal direction so that the pair of jaws grip an object, wherein each of the pair of jaws comprises a contact portion extending in a vertical direction and contacting the object, a first actuation mechanism connected to the contact portion and configured to move the contact portion in the vertical direction, and a second actuation mechanism connected to the first actuation mechanism and the contact portion and configured to maintain a posture in which the contact portion extends in the vertical direction, wherein the first actuation mechanism comprises an upper joint portion and a lower joint portion that are connected while forming a first angle therebetween and passively rotate to move the contact portion in the vertical direction when in contact with a ground, and a first elastic member connected between the upper joint portion and the lower joint portion to provide a restoring force, wherein the second actuation mechanism comprises a link unit connected to the first actuation mechanism, and a support portion that is connected to the link unit and supports the contact portion to maintain the posture of the contact portion in the vertical direction, wherein the link unit comprises an upper link corresponding to the upper joint portion, and a lower link corresponding to the lower joint portion, wherein a second angle between the upper link and the lower link changes in response to a change in the first angle, and wherein the second actuation mechanism further comprises a second elastic member that provides a restoring force by being connected between the lower link and the contact portion.

* * * * *